United States Patent [19]

Skarstad et al.

[11] Patent Number: 4,761,355
[45] Date of Patent: Aug. 2, 1988

[54] ELECTROCHEMICAL CELLS AND CATHODE MATERIALS

[75] Inventors: Paul M. Skarstad, Plymouth; Darrel F. Untereker, Cedar; Donald R. Merritt, Minneapolis, all of Minn.

[73] Assignee: Medtronic, Inc., Minneapolis, Minn.

[21] Appl. No.: 321,460

[22] Filed: Nov. 16, 1981

Related U.S. Application Data

[63] Continuation-in-part of Ser. No. 210,027, Nov. 24, 1980, abandoned.

[51] Int. Cl.$^4$ ............................................. H01M 4/60
[52] U.S. Cl. .................................. 429/213; 252/182.1
[58] Field of Search ....................... 429/191, 212–217; 252/182.1

[56] References Cited

U.S. PATENT DOCUMENTS

| | | |
|---|---|---|
| 3,352,720 | 11/1967 | Wilson . |
| 3,660,163 | 5/1972 | Moser ............................... 136/83 R |
| 3,660,164 | 5/1972 | Heimann ........................... 136/83 R |
| 3,674,562 | 7/1972 | Schneider et al. . |
| 4,038,459 | 7/1977 | Ajami et al. ........................... 429/15 |
| 4,038,460 | 7/1977 | Walsh et al. . |
| 4,182,798 | 1/1980 | Skarstad .............................. 429/213 |
| 4,210,706 | 7/1980 | Skarstad . |
| 4,211,832 | 7/1980 | Mueller ........................... 429/213 X |
| 4,223,110 | 9/1980 | Phillips ............................ 429/213 X |
| 4,263,382 | 4/1981 | Louzos ................................. 429/213 |
| 4,269,911 | 5/1981 | Fukuoka ......................... 429/212 X |

FOREIGN PATENT DOCUMENTS

68/8126 9/1985 South Africa .

OTHER PUBLICATIONS

Product Bulletin entitled, "Polyox Water Soluble Resins", (New York, Union Carbide Corp., May, 1975), pp. 1–23.

*Primary Examiner*—Donald L. Walton
*Attorney, Agent, or Firm*—Vidas & Arrett

[57] ABSTRACT

Improved halogen cathode materials having oxygen-based components and electrochemical cells incorporating same.

16 Claims, 3 Drawing Sheets

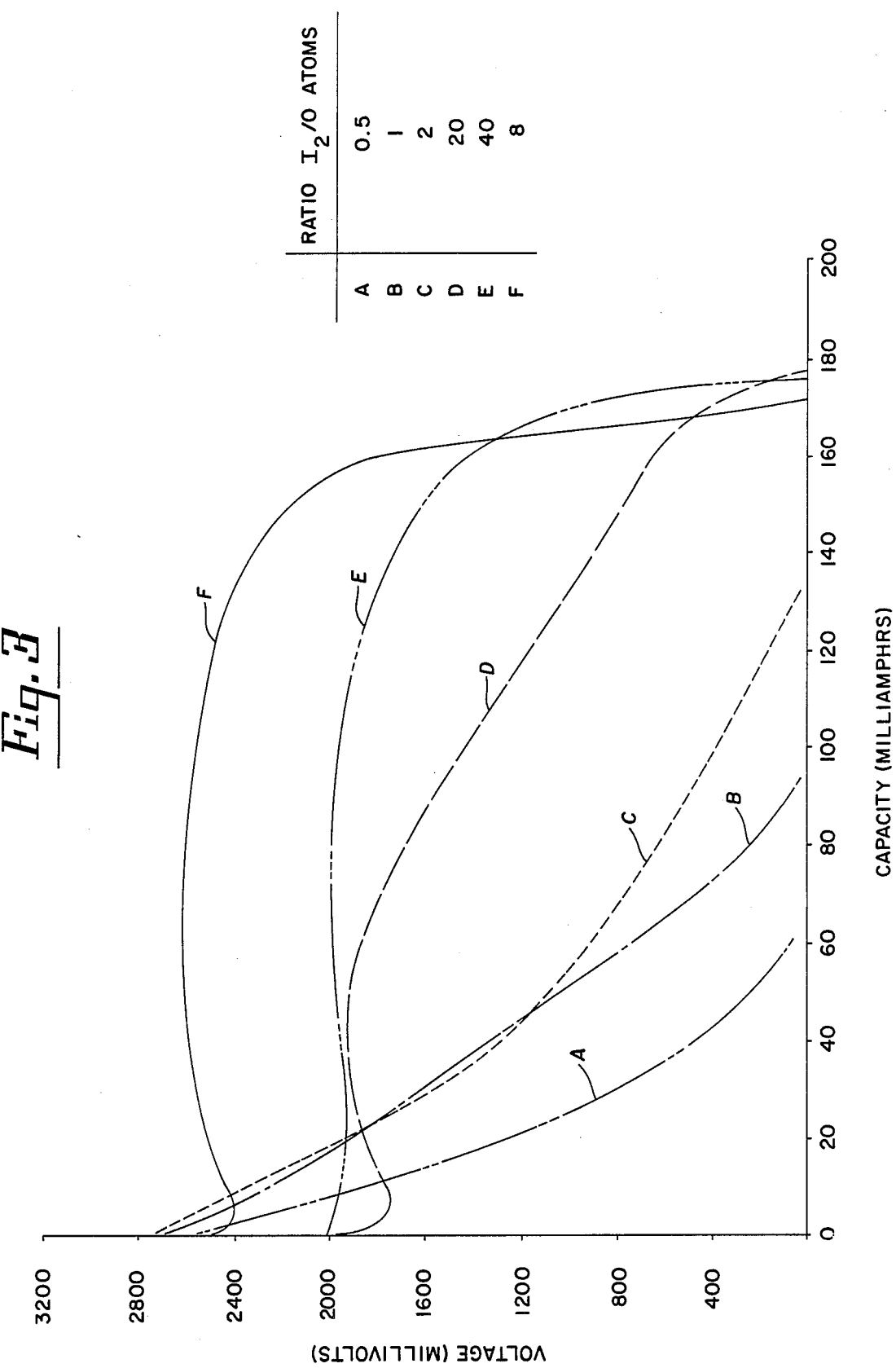

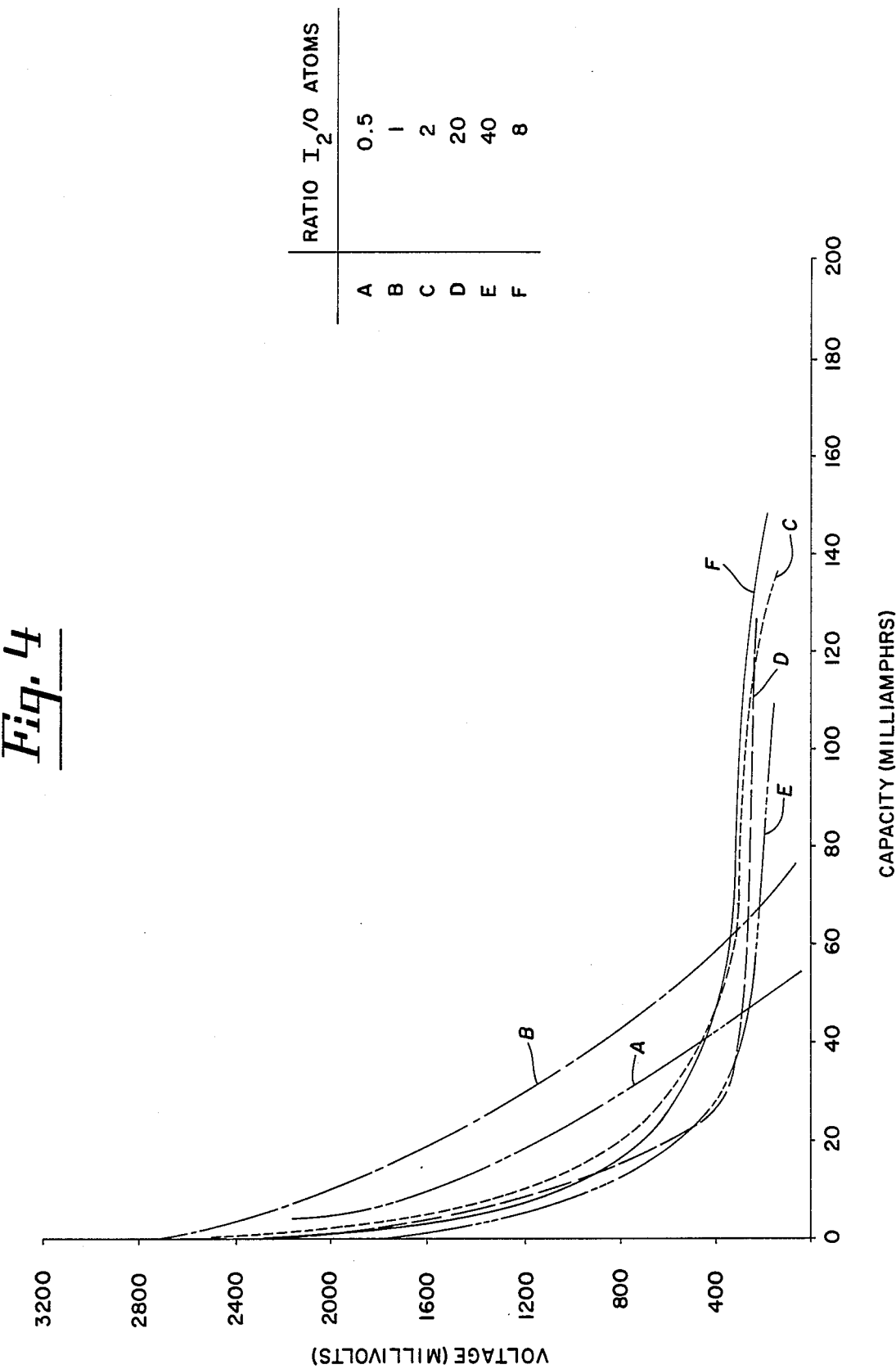

ELECTROCHEMICAL CELLS AND CATHODE MATERIALS

BACKGROUND OF THE INVENTION

This is a continuation-in-part application of copending patent application Ser. No. 210,027, filed Nov. 24, 1980, abandoned entitled "ELECTROCHEMICAL CELLS". This continuation-in-part application is assigned to the same assignee as is the parent application i.e., to Medtronic, Inc.

This invention relates to the conversion of chemical energy to electrical energy and more particularly to a new and improved cathode material for use in cells and batteries, herein referred to generally as electrochemical cells.

One area of use for the cathode materials of the present invention is in cells for providing electrical power to inaccessible devices such as implanted cardiac pacemakers. However, the present invention is applicable to a wide variety of batteries and electrochemical cells. It is particularly applicable to primary batteries intended to provide relatively high voltage and high energy density over long life under low current drain conditions.

In certain instances, the cathode materials and cells of this invention may be produced and encapsulated in a dry atmosphere, suitably in dry rooms or enclosures having a relative humidity less than about two percent, using substantially anhydrous and/or dried components. All of the cathode materials, cells and tests of cells described herein were prepared and performed substantially in sealed enclosures which, while not necessarily completely hermetic, did use substantially anhydrous components. In production embodiments, the cathode materials and electrochemical cells of this invention may be preferably enclosed in hermetically sealed enclosures such as welded stainless steel containers with appropriate electrical feedthrough arrangements for electrically contacting the cell components as is known in the art. The production of such cathode materials and the assembly of such cells is preferably accomplished in a dry room.

SUMMARY OF THE INVENTION

This invention is based on the discovery that certain organic oxygen-containing compounds (to be specifically described further hereinbelow) are particularly useful, when mixed with iodine, bromine or the interhalogen iodine bromide (IBr) (all hereinafter referred to generally as halogen(s)), as cathode materials in electrochemical cells. These oxygen-containing compounds are useful because they form electrically conductive compositions with halogens; that is, compositions in which the electrical conductivity is much greater than that of the halogen alone. The cathode materials are herein referred to as mixtures and defined as to their composition in terms of the components as initially mixed together. In some instances reaction products may be produced which vary from the initial components forming the mixtures. In such mixtures and preferably under substantially anhydrous conditions the halogen may be readily utilized as the electrochemically active constituent of the cathode material. The preferred halogen is iodine. The preferred oxygen-containing organics are: poly(ethylene oxide) (PEO) such as POLYOX water soluble resins, ethanol, polypropylene oxide and vinyl acetate. POLYOX is a trademark designation used by Union Carbide Corporation for the poly(ethylene oxide) it markets. Polymeric, non-polymeric (polymerizable and unpolymerizable) organics and mixtures thereof are acceptable as the oxygen-containing organic. The term "polymeric" is meant to include any organic containing three or more monomer units. The term "non-polymeric" is meant to include any organic which does not fall within the meaning of "polymeric" as already defined.

The preferred anode for electrochemical cells utilizing the mixtures as cathode material is lithium. However, any metal or alloy, which forms an ionically conductive halide eg., silver, calcium, magnesium, sodium, lithium-magnesium, lithium-calcium alloys, and the like may be used. The mono-valent metals are preferred.

In their preferred form, the cells of the invention may be constructed, and are so shown herein, to form electrolytes in situ. For example, when the electrochemically active ingredients are lithium and iodine, a solid lithium iodide electrolyte forms between the anode and cathode after the cell has been constructed. Alternatively, the electrolyte can be performed in whole or in part. For example, one might make use of the following arrangement: Li/LiI(Al$_2$O$_3$)/PEO.nI$_2$. Such an arrangement might be desirable for modifying a self-discharge rate. Such alumina dispersions are reported in C. C. Liang, *J. Electrochem. Soc.* 120, pg 1289 (1973); C. C. Liang and L. H. Barnette, *J. Electrochem. Soc.* 123, pg 453 (1976), and Liang U.S. Pat. No. 3,713,897, all of which are incorporated herein by reference.

Another modification which may be incorporated in these cells as a part of the operative relationship thereof is the use of an anode coated with poly(2-vinylpyridine) (P2VP) or other polymeric material such as described in the U.S. Mead et al Pat. No. 3,957,533 or a self-supporting poly(2-vinylpyridine) body such as described in the U.S. Skarstad Pat. No. 4,182,798. The subject matter of these patents is incorporated herein by reference. Poly-N-vinylpyrollidine cathodes according to this invention when used with such lithium/P2VP anodes provide a battery of unusually high rate capability for this type of cell.

BRIEF DESCRIPTION OF THE DRAWINGS

FIGS. 3 and 4 are graphs showing voltage versus discharged capacity (Q) for test cells of the invention.

DETAILED DESCRIPTION OF THE INVENTION

The invention is directed to improved cathode materials and cells incorporating the materials. The invention is not directed to any particular cell or battery design but rather to any combination of components making up an electrochemical cell or battery wherein the cathode material is of the improved type described herein. Consequently, the invention is not limited to any particular electrochemical cell design or structural arrangement. In physical arrangement, it is only required that anode and cathode means of the cell or battery, including the cathode material of the invention, be placed in operative relationship with each other in the broadest sense. For the purpose of being substantially anhydrous or substantially non-aqueous, cells are assembled and encapsulated in a dry atmosphere, preferably in a dry room or enclosure having a relative humidity less than about 2 percent using substantially anhydrous and/or dried components.

Figure 2:
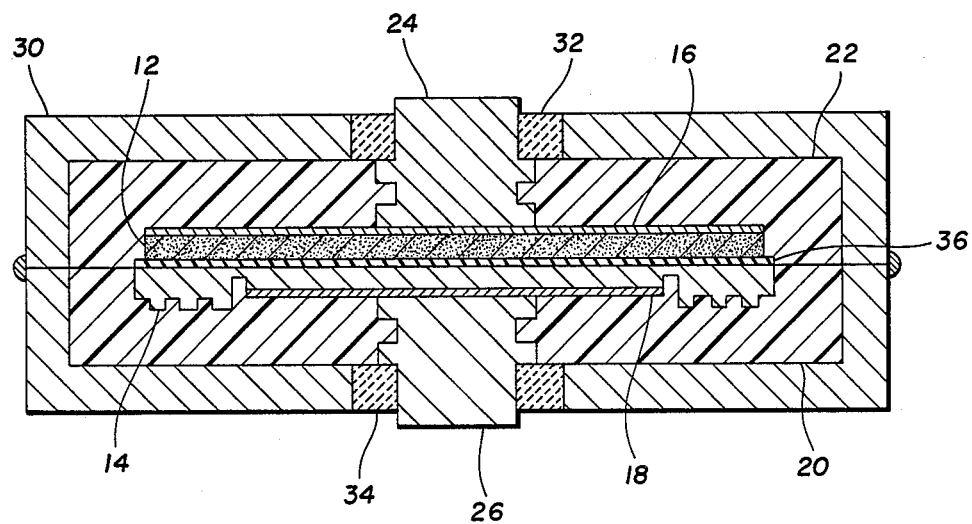
FIG. 2 comprises a schematic showing of a hermetically sealed cell including a body of poly(2-vinylpyridine).

In the following description illustrative cells in accordance with this invention, as shown in the Figures, are flat, cylindrical cells with flattened, disc-like components. It should be understood that any configuration for the cell and components is satisfactory for this invention. The cathode material is indicated in the Figures at 12 whereas the anode, preferably lithium, is indicated at 14. Both the anode and cathode are contacted by inert current collectors 16 and 18, respectively, which may be of metal such as Hastelloy or stainless steel. In the cell shown, the lithium anode is ultrasonically formed and welded peripherally around the current collector 18 so as to prevent contact between the collector and the cathode material 12. The electrochemically active components i.e., the cathode and anode 12 and 14, and current collectors 16 and 18 are enclosed in a cup-shaped chemically inert non-conductive container 20 which may be of a plastic material eg., Kynar, a trademark of Pennwalt Corporation for polyvinylidine fluoride, and a sealing lid 22 of the same material. These two components may be ultrasonically welded together or otherwise sealed. Other insulating, inert materials, such as Halar a trademark of Allied Chemical Corporation for ethylene-chlorotrifluorethylene and Tefzel, a trademark of E. I. DuPont de Nemours, Co. for a co-polymer of ethylene and tetrafluorethylene, may be used for these components. Stainless steel leads 24 and 26 are molded into container components 20 and 22 and serve to electrically contact current collectors 16 and 18. For hermetically sealing the cell, the entire unit as shown in FIG. 2 is enclosed in a stainless steel container 30 with glass-to-metal seals 32 and 34 around the electrical leads 24 and 26, as is practiced in the art. Container 30 may conveniently be made in two cup-shaped parts as shown, which are welded together.

The cell of FIG. 2 includes a body or a film 36 of poly(2-vinylpyridine) polymer carried on the operative surface of anode 14, the operative surface being that surface which normally contacts the cell cathode, at least initially.

Cells of the type described above require no electrolyte as initially constructed. Consequently, no electrolyte per se is shown in the Figures. However, following assembly, an electrolyte does form in situ. The electrolyte builds up between the cathode and the anode, usually taking the form of a layer, due to the reaction between the anode metal and the iodine in the cathode. For example, in a cell having a lithium anode and iodine in the cathode, a lithium iodide electrolyte will form.

In accordance with the invention, iodine or other halogen or mixtures thereof, and a selected oxygen-containing organic component or mixture of components are mixed directly together in various relative amounts to form cathode material 12. In most cases the mixture is preferably heated at relatively modest temperatures such as 125° C. or so. This is particularly desirable when the oxygen-containing organic component is a polymeric compound. On the other hand, a non-polymer such as tetrahydrofuran (THF) may not require heating when mixing with the halogen. POLYOX, a preferred poly(ethylene oxide) is heated with iodine for about one hour at about 125° C. for good results.

Some caution is necessary when compounding various organic components with the halogen. For example, mixtures of starch and iodine and some mixtures of poly(ethylene oxide) and iodine decompose violently above temperatures of about 125° C.

Iodine, being a particulate material, may be used in either a course particle form or a finely divided particle form, such as iodine which has been milled to a powder. It is preferred that finely divided iodine be used.

The oxygen-containing organic component may be selected from various groups as set forth hereinbelow.

The first major group consists of non-polymeric compounds selected from the group consisting of:

ethers such as tetrahydrofuran (THF), diethylether, and butylmethylether, alcohols such as ethanol, phenol and ethylene glycol ketones such as acetone and methylethylketone;

aldehydes such as butyraldehyde and acetaldehyde;

esters such as vinylacetate, ethylacetate, amylacetate and ethylbutyrate;

acids such as acetic acid and oxalic acid;

organic carbonates such as propylene carbonate and diethyl carbonate;

salts such as sodium acetate, sodium propioanate and potassium acetate;

anhydrides such as acetic anhydride, and amides such as dimethylformamide.

These non-polymeric compounds are either monofunctional or difunctional as to oxygen. That is, the compounds contain only one or two oxygen functional groups as listed in Table I by way of example.

TABLE I

| Compound Type | Functional Group* |
|---|---|
| ether |  |
| alcohol |  |
| ketones |  |
| aldehydes |  |
| esters |  |
| acids |  |
| salts |  |
| anhydrides |  |

TABLE I-continued

| Compound Type | Functional Group* |
|---|---|
| carbonates | 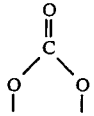 |
| amides |  |

*A compound containing one functional group is called "monofunctional". A compound containing any two functional groups is called "difunctional".

TABLE II

Examples of Monofunctional Non-polymeric Compounds of The Alkyl, Aryl and Cycloalkyl Types*

| Class | Compounds |
|---|---|
| ethers | diethylether, tetrahydrofuran and diphenylether |
| alcohols | ethanol, cyclohexanol and phenol |
| ketones | acetone, cyclohexanone, diphenylketone and methylphenylketone |
| aldehydes | acetaldehyde, cyclohexanal and benzaldehyde |
| esters | ethylacetate, ε-caprolactone, phenylbenzoate, ethylbenzoate and phenylacetate |
| acids | acetic acid, cyclohexanoic acid and benzoic acid |
| anhydrides | acetic anhydride, succinic anhydride, maleic anhydride and benzoic anhydride |
| salts | sodium acetate, lithium cyclohexanoate and calcium benzoate |
| carbonates | diethyl carbonate, propylene carbonate, methylphenyl carbonate |
| amides | N,N'—dimethylformamide, ε-caprolactam, benzamide |

*Includes: alkenyl, alkynyl, cycloalkenyl and cycloalkynyl.

TABLE III

Examples of Difunctional Non-Polymeric Compounds Of the Alkyl, Aryl and Cycloalkyl Types*

| | Heterodifunctional |
|---|---|
| ethers/alcohols | ethyleneglycolmono (ethyl-, phenyl-and cyclohexyl-) ethers and the like |
| ketone/alcohol | diacetone alcohol |
| aldehyde/acid | glyoxylic acid |
| ester/alcohols | ethyleneglycolmono (ethyl-, phenyl-, benzyl- and cyclohexyl-) acetates, benzoates, hydroxyethylmethacrylate |
| salt/aldehyde | lithium glyoxylate |
| carbonate/ethers | p-dimethoxyphenyl carbonate, p-methoxyphenylmethyl carbonate |
| amide/ketone | diacetoneacrylamide |
| | Homodifunctionals |
| ethers | ethyleneglycoldimethylether, dioxanes and ethyleneglycoldiphenylether |
| alcohols | ethylenediol, 1,4-cyclohexanediol and cresols |
| ketones | diacetyl, dimedone and anthroquinone |
| aldehydes | glyoxal, cyclohexane-1,3-dialdehyde and phthalaldehydes |

TABLE III-continued

Examples of Difunctional Non-Polymeric Compounds Of the Alkyl, Aryl and Cycloalkyl Types*

| esters | diethyloxalate, dimethylcyclohexanedicarboxylate and diethylterephthalate |
|---|---|
| acids | oxalic acid, cyclohexanedicarboxylic acids and terephthalic acid |
| anhydrides | pyromellitidianhydride and 1,2,4,5-cyclohexantetracarboxylic acid anhydride |
| salts | sodium oxalate, lithium cyclohexanedicarboxylate, calcium terephthalate |
| amides | methylenebisacrylamide, cyclohexanedicarboxamide and terephthalamide |

Additionally, any of the compounds of this first group may be mixed together or may even be mixed with other materials such as:
tetrahydrofuran+poly(2-vinylpyridine) or aniline or pyridine for example in equal amounts (number of oxygen atoms equals number of nitrogen atoms)
poly(ethylene oxide)+triphenylphosphineoxide The second major group consists of non-polymeric compounds selected from the group consisting of the following:
ethers—crown ethers and tetraethyleneoxide
alcohols—glycerol and pentaerythritol
ketones—1,3,5-cyclohexanetrione
aldehydes—benzenetricarboxaldehyde
esters—glyceryltributyrate
acids—trimellitic acid
carbonates—methylglyceryl tricarbonate and pentaerythritoltetramethyl carbonate
salts—sodium trimellitate
amides—trimellitamide These non-polymeric compounds are homofunctional as to oxygen. That is, the compounds contain only one type of oxygen-containing functional group i.e., all of the oxygen-containing functional groups in the compound are of the same type i.e., all ether groups, alcohol groups, ketone groups, aldehyde groups, ester groups, acid groups, salt groups, anhydride groups, amide groups and organic carbonate groups.

Additionally, any of the compounds of this second group may be mixed together or may be mixed with other materials.

The third major group consists of polymeric compounds selected from the group consisting of the following:
ethers—poly(vinylmethylether), poly(oxyethylene) (PEO), poly(oxypropylene) (PPO) and poly(oxyphenylene);
alcohols—poly(vinylalcohol), phenol-formaldehyde resins;
in-chain polyesters—poly(ethyleneterephthlate) and poly(butyleneterephthlate);
ketones—poly(methylvinylketone);
acids—poly(acrylic acid) (PAA);
carbonates—hexanediolpolycarbonate, tetramethylcyclobutane-1,3-diolpolycarbonate and bisphenol-A-polycarbonate;
salts—sodium poly(acrylate), and anydrides—polystyrene-maleic anhydride, and the following specific polymeric compounds:
poly(vinyl succinate)

poly(vinylacetate)
methylcellulose
starch

The polymeric compounds of this group may be either monofunctional or difunctional as to oxygen in the same sense as noted for the compounds in the first group. That is, the compounds contain at least one monofunctional or difunctional group with respect to repeating units or terminal units of the polymers.

Additionally, any of the compounds of this group may be mixed together, mixed with any of those of the first two groups or mixed with other materials such as:
poly(ethylene oxide)+poly(2-vinylpyridine) for example in equal amounts (number of oxygen atoms equals number of nitrogen atoms).

The fourth major group consists of the specific compound: triphenylphosphineoxide (TPP).

The fifth major group consists of mixtures of any of the compounds taken from any of the four foregoing major groups such as:
diethylether+polyvinylalcohol
tetrahydrofuran+polymethylvinylketone
ethanol+poly(acrylic acid)
ethanol+sodium salt of poly(acrylic acid)

The oxygen-containing organic compounds of the invention can be characterized generally as being non-nitrogen containing compounds in the sense that if nitrogen is present it is not present in the same fashion as the nitrogen contained in the pyridine-type cathode material compounds eg., poly(2-vinylpyridine) and so forth. In these latter compounds the nitrogen is included in the compound so as to be able to share electrons with a halogen such as iodine. This is to be distinguished from those kinds of compounds of the present invention eg., the ammonium salts of acids of the type disclosed above wherein the nitrogen is unable to share electrons with a halogen such as iodine. That is, with the oxygen-containing compounds of the invention, the oxygen is believed to be involved in electron sharing with the halogen. There is an exception to this in that poly(N-vinylpyrrolidone) contains an active nitrogen in addition to an active oxygen. However, insofar as poly(N-vinylpyrrolidone) is concerned, it is a special case to be further described hereinbelow.

Viscosity may be important in certain applications to prevent any substantial segregation of the various cathode components. This will vary from solid to liquid depending on the particular cathode combination and its intended use. Viscosity may be controlled by adding either a thinning solvent or a thickening agent (collectively referred to herein as viscosity adjusting agents) to the cathode material depending on whether it is desired to increase viscosity or decrease it. Thinning solvents such as chloroform and orthodichlorobenzene, are illustrations of inert solvents which may be used. Alternatively, a thinning solvent may be used which is an oxygen-containing compound of this invention or a mixture of oxygen-containing compounds of this invention. Examples of compounds of this invention which are useful as thinning solvents include ethanol, acetone, tetrahydrofuran and diethylether. Illustrative inert thickeners are fumed $SiO_2$, finely divided $AlI_3$, finely divided $Al_2O_3$, sheet silicates such as montmorillonite, finely ground lithium iodide, hydrocarbon polymers eg., polystyrene, polybutene, poly(alpha-methylstyrene) and styrene-butadinene rubbers. Alternatively, a thickener may be used which is an oxygen-containing compound of this invention or a mixture of oxygen-containing compounds of this invention. Examples of compounds of this invention which are useful as thickening agents include poly(ethyleneoxide), and poly(propyleneoxide).

EXAMPLE I

Figure 1:
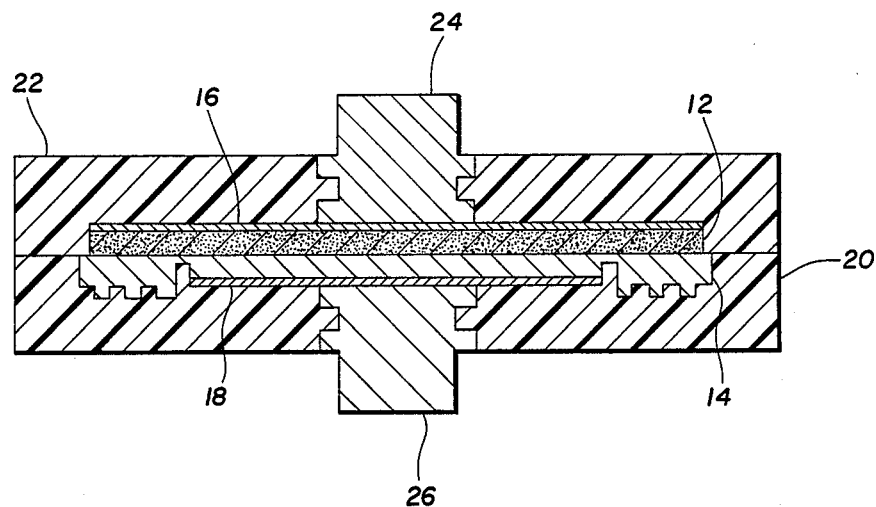
FIG. 1 comprises a schematic showing of an electrochemical test cell utilizing the improved cathode materials of the invention.

Cells of the type shown in FIG. 1 were constructed for test purposes. The cells had lithium anodes and utilized as cathodes mixtures of iodine and the various compounds listed in Table 4. The active area of the anode was 5.1 cm$^2$. The cathode materials were prepared by heating mixtures of iodine and each additive compound together in a sealed glass ampule in a rocking furnace at 125° C. for one hour unless otherwise indicated. Conductivities of the cathode materials are shown in Table 1. The mixtures were prepared so that initially the ratio of iodine molecules ($I_2$) to oxygen atoms of the additive was 8.0. All ratios throughout are expressed in these same terms unless otherwise indicated. All cells were cathode-limited with stoichometric iodine capacity of 200 mAh. All cells of this example were assembled with a sheet of poly(2-vinylpyridine) 0.08 mm thick interposed between anode and cathode as shown in FIG. 2. The cells were discharged at 37° C. under a 10K ohm resistive load. All cells had open-circuit voltages of about 2.8 volts.

Mean delivered capacity (to a 100 mv cut-off unless otherwise specified), based on the best two of three identical cells, is presented in Table 1 for each class of oxygen-containing additive compound.

TABLE 4

| | IODINE CATHODES WITH OXYGEN-CONTAINING COMPONENTS: CONDUCTIVITY AND CELL PERFORMANCE | | | | |
|---|---|---|---|---|---|
| Class | Oxygen-Containing Compound | Cathode Conductivity (ohm$^{-1}$cm$^{-1}$) | Mean Initial OCV (Volts) | Mean Delivered Capacity (mAh) | Mean Cathode Utilization (%) |
| ethers | poly(ethyleneoxide), (PEO) | $1.79 \times 10^{-4}$ | 2.80 | 172 | 86 |
| | poly(propyleneoxide), (PPO) | $1.98 \times 10^{-4}$ | 2.80 | 176 | 88 |
| | 0.7/0.3 PEO/PPO Copolymer | — | 2.80 | 178 | 89 |
| | tetrahydrofuran, (THF) | $1.27 \times 10^{-4}$ | 2.87 | 130 | 65 |
| | poly(vinylbutyral) | $4.13 \times 10^{-4}$ | 2.80 | 148 | 74 |
| alcohols | poly(vinyl alcohol), (PVA) | $1.826 \times 10^{-3}$ | 2.94 | 158 | 79 |
| | methycellulose | — | 2.77 | 153 | 77 |
| | phenol | $5.0 \times 10^{-6}$ | 2.80 | 146 | 73 |
| | starch | — | 2.83 | 180 | 90 |
| | ethanol | $5.496 \times 10^{-5}$ | 2.80 | 180 | 90 |
| ketones | methylethyl ketone | $1.5 \times 10^{-4}$ | 2.80 | 160 | 80 |
| esters | poly(vinylsuccinate) | — | 2.78 | 162 | 81 |
| | poly(vinylacetate) | $5.38 \times 10^{-6}$ | 2.78 | 164 | 82 |
| | vinyl acetate | $4.17 \times 10^{-6}$ | 2.78 | 182 | 91 |
| acids | poly(acrylic acid), (PAA) | — | 2.71 | 169 | 80 |

TABLE 4-continued

IODINE CATHODES WITH OXYGEN-CONTAINING
COMPONENTS: CONDUCTIVITY AND CELL PERFORMANCE

| Class | Oxygen-Containing Compound | Cathode Conductivity (ohm$^{-1}$cm$^{-1}$) | Mean Initial OCV (Volts) | Mean Delivered Capacity (mAh) | Mean Cathode Utilization (%) |
|---|---|---|---|---|---|
| | acetic acid | 3.7 × 10$^{-6}$ | 2.73 | 166 | 83 |
| | oxalic acid | — | 2.69 | 168 | 80 |
| salts | sodium salt of PAA | — | 2.76 | 155 | 78 |
| | ammonium salt of PAA | — | 2.78 | 176 | 88 |
| | sodium acetate | 2.1 × 10$^{-4}$ | 2.95 | 159 | 80 |
| anydrides | acetic anydride | 6.5 × 10$^{-5}$ | 2.79 | 178 | 89 |
| other | poly(N—vinylpyrrolidone) | 2.7 × 10$^{-5}$ | 2.79 | 186 | 93 |
| | triphenylphosphineoxide (TPP) | 2.7 × 10$^{-5}$ | 2.78 | 130 | 65 |

EXAMPLE II

Mixtures of iodine and polyethylene oxide (PEO) were prepared over the range of starting compositions 0.50 to 40.0 iodine molecules ($I_2$) per oxygen atom of the PEO. The PEO used in these mixtures was POLYOX obtained from Union Carbide Corporation. The water content of the PEO determined by the Karl Fisher analysis was 0.21%.

Table 5 shows the variation in the electrical conductivity and density with composition measured on pellets pressed from mixtures prepared in sealed glass ampules and heated in a rocking furnace under the specified conditions. Three identical cathode-limited cells with 200 mAh stoichometric iodine capacity were constructed as described in Example I for each composition shown in Table 5. An additional set of cells was constructed for each composition without a P2VP sheet between anode and cathode but otherwise identical. The cells were discharged at 37° C. under 10K ohm resistive loads. Delivered capacities above a 100 mv cutoff (unless otherwise specified) are shown in Table 6. Mean discharge curves are shown in FIGS. 3 and 4 for cells with and without P2VP sheets, respectively.

TABLE 5

CATHODE MATERIAL ($I_2$/PEO)-
PREPARATION AND PROPERTIES

| Composition ($I_2$/O) | Preparation Temp. (C.°) | Time (hr) | Conductivity (ohm$^{-1}$cm$^{-1}$) | Density (g/cm$^3$) |
|---|---|---|---|---|
| 0.5 | 100 | 1.0 | 2.0. × 10$^{-4}$ | 2.62 |
| 1.0 | 100 | 1.0 | 4.8 × 10$^{-4}$ | 3.54 |
| 2.0 | 100 | 1.0 | 3.9 × 10$^{-4}$ | 4.35 |
| 8.0 | 125 | 1.0 | 7.3 × 10$^{-5}$ | 4.77 |
| 20.0 | 125 | 1.0 | 4.5 × 10$^{-6}$ | 4.80 |
| 40.0 | 125 | 1.0 | 2.0 × 10$^{-7}$ | 4.88 |

TABLE 6

CELL PERFORMANCE WITH VARYING
CATHODE COMPOSITION ($I_2$/PEO)*

| Cathode Composition ($I_2$/O) | Delivered Capacity (mAh) | Utilization (% of total iodine) | Balanced*** Electrode Volume (cm$^3$) | Specific Capacity (mAh/cm$^3$) |
|---|---|---|---|---|
| WITH P2VP SHEET | | | | |
| 0.5 | 58(12) | 29(6) | 0.625 | 93(19) |
| 1.0 | 97(17) | 49(8) | 0.450 | 216(38) |
| 2.0 | 128(7) | 64(4) | 0.373 | 343(19) |
| 8.0 | 171(1) | 86(1) | 0.339 | 505(3) |
| 20.0 | 182(8) | 91(4) | 0.335 | 544(24) |
| 40.0 | 177(1) | 88(1) | 0.331 | 534(2) |
| theoretical | | | 0.327 | 610 |
| WITHOUT P2VP SHEET | | | | |
| 0.5 | 52(12) | 26(6) | 0.586 | 89(20) |
| 1.0 | 72(7) | 36(4) | 0.411 | 175(17) |
| 2.0** | 141(6) | 71(3) | 0.334 | 422(17) |
| 8.0** | 155(2) | 78(1) | 0.300 | 516(7) |
| 20.0** | 143(12) | 72(6) | 0.296 | 483(41) |
| 40.0** | 117(17) | 59(9) | 0.292 | 400(58) |
| theoretical | | | 0.289 | 692 |

*Standard deviations are shown in parentheses.
**100 mv cutoff not reached.
***Volume of P2VP sheet included if present.

EXAMPLE III

Cells of the type described in the above examples were constructed at $I_2$:O ratios of 8.0 and/or 20.0 at preparation temperatures below 125° C. Oxygen-containing compounds of various molecular weights were used with iodine to make the cathode materials. The heating time was 1 hour except for the one sample prepared by mixing the components at room temperature only. The variations studied and the utilizations achieved from three-cell sets are shown in Table 7. All of these cells had a 0.08 mm thick sheet of poly(2-vinylpyridine) interposed between the anode and cathode. They were discharged at 37° C. under 10K ohm resistive loads.

No significant variations were observed in cathode utilization with varying molecular weight (MW). It was observed that the cells discharged satisfactorily even when the cathode was not heated at all in its preparation. Consequently, although heating may be desirable in cathode preparation, it is not necessary.

TABLE 7

TEMPERATURE PREPARATION/CELL
PERFORMANCE WITH VARYING MW PEO

| Cathode Preparation Temperature (°C.) | Cathode Composition ($I_2$/O) | PEO Type | Cathode Utilization (%) |
|---|---|---|---|
| 25 | 20 | POLYOX | 87 |
| 100 | 8 | POLYOX | 91 |
| 100 | 8 | MW 5,000,000* | 90 |
| 100 | 20 | MW 600,000* | 91 |
| 100 | 8 | MW 20,000* | 90 |

*Obtained from Polysciences, Warrington, PA.

EXAMPLE IV

Six variations of cathode material were made from blends of 20,000 and 5,000,000 molecular weight PEO in various proportions as the oxygen-compound component. The two molecular weights of PEO were varied from 0 to 100% in 20% increments. The initial ratio of $I_2$ molecules to 0 atoms was fixed at 20 in each case. The PEO compounds were obtained from Polysciences of Warrington, PA. Each mixture was blended and then heated for 1 hour at 125° C. as described above. Cells were constructed in sets of three, all using a 0.08 mm thick sheet of poly(2-vinylpyridine) interposed between the anode and the cathode. All cells were discharged at 37° C. under 10K ohm loads. The mean delivered capacities for these cell sets are summarized in Table 8.

TABLE 8

CELL PERFORMANCE WITH BLENDED PEO OF TWO MOLECULAR WEIGHTS

| PEO Component Composition (% MW 20,000, Balance MW 5,000,000 PEO) | Cathode Utilization (%) |
|---|---|
| 0 | 86 |
| 20 | 90 |
| 40 | 86 |
| 60 | 88 |
| 80 | 90 |
| 100 | 90 |

EXAMPLE V

Mixtures of iodine and oxygen-containing organic compounds, in turn mixed with a nitrogen-containing compound, were prepared. The constituents were heated in a sealed glass ampule in a rocking furnace at 125° C. for 1 hour in the case of 2-ethylpyridine and aniline or 24 hours in the case of poly(4-vinylpyridine). These materials were tested as cathodes in cells with 200 mAh stoichiometric iodine capacity like those described in Example I. Three identical cells were tested for each cathode at a starting composition of 8 iodine molecules per sum of oxygen plus nitrogen atoms as shown in Table 9. Cells were discharged as described in Example I. Capacities delivered above 100 mv are shown in Table 9.

scribed and included P2VP sheet on the lithium anode. The cells were discharged as described in Example I. Discharge data for such a cell is shown in Table 4. The cell discharged with a nearly constant voltage of 2.5 volts at a current density of 50 microamps/cm² out to 80% of stoichiometric capacity.

Having described the invention by way of illustration, the exclusive property rights are defined by the following claims.

What is claimed is:

1. An electrochemical cell comprising anode and cathode means in operative relationship, the cathode means comprising a cathode material comprised of, at least in part:
   a halogen component selected from the group consisting of iodine, bromine, iodine bromide and mixtures thereof, and poly(ethylene oxide), at least in part.

2. As a cathode material for electrochemical cells, a combination comprising a mixture of a halogen component and poly(ethylene oxide).

3. The cathode material of claim 2 wherein the halogen component is iodine, at least in part.

4. The cathode material of claim 2 wherein the amount of the halogen component is greater than the amount of the poly(ethylene oxide).

5. An electrochemical cell comprising anode and cathode means in operative relationship, the cathode means comprising, a cathode material consisting of a halogen component selected from the group consisting of iodine, bromine, iodine bromide, and mixtures thereof, and poly(ethylene oxide).

6. The electrochemical cell of claim 5 wherein the amount of halogen component is greater than the amount of the poly(ethylene oxide).

7. A cathode material comprising, at least in part, a halogen component selected from the group consisting of iodine, bromine, iodine bromide and mixtures thereof, and poly(ethylene oxide), at least in part.

8. As a cathode material for electrochemical cells, a combination consisting essentially of a mixture of a

TABLE 9

CELL PERFORMANCE WITH MIXED OXYGEN/NITROGEN COMPONENTS

| | | WITH P2VP SHEET | | WITHOUT P2VP SHEET | |
|---|---|---|---|---|---|
| Organic Components | Cathode Composition ($I_2$/O/N) | Mean Delivered Capacity (mAh) | Mean Cathode Utilization (%) | Mean Delivered Capacity (mAh) | Mean Cathode Utilization (%) |
| POLYOX, 2-ethylpyridine | 8/0.5/0.5 | 143 | 71.5 | 147 | 73.5 |
| POLYOX, poly(4-vinylpyridine) | 8/0.5/0.5 | 167 | 83.5 | 173 | 86.5 |
| PEO(M.W. 20,000)*, poly(4-vinylpyridine) | 8/0.5/0.5 | 139 | 29.5 | 165 | 82.5 |
| POLYOX, aniline | 8/0.5/0.5 | 170 | 85 | | |

*Obtained from Polysciences, Warrington, PA.

EXAMPLE VI

Cathode material comprised of or including poly(N-vinylpyrrolidone) presents a special case in the context of this invention. It has been determined that such cathode materials provide cells of unusually high rate capabilities when used in combination with an anode coated with poly(2-vinylpyridine) (P2VP) or associated with a self-supporting body of P2VP or with other polymeric material as aforementioned. A cathode mixture of iodine and poly(N-vinylpyrrolidone) was prepared as described in Example I. Cells were constructed as dehalogen component and poly(ethylene oxide).

9. The cathode material of claim 8 wherein the halogen component is iodine, at least in part.

10. The cathode material of claim 8 wherein the amount of the halogen component is greater than the amount of the poly(ethylene oxide).

11. A cathode material comprised of a halogen component selected from the group comprising of iodine, bromine, iodine bromide and mixtures thereof, and poly(ethylene oxide).

12. An electrochemical cell comprising anode and cathode means in operative relationship; a polymeric component associated with the anode means and positioned between the anode means and the cathode means; the cathode means comprising, at least in part, a halogen with poly(N-vinylpyrrolidone).

13. The cell of claim 12 wherein the anode means is comprised of lithium.

14. The cell of claim 12 wherein the polymeric component comprises poly(2-vinylpyridine).

15. The cell of claim 14 wherein the poly(2-vinylpyridine) is in the form of a coating on the anode means.

16. The cell of claim 14 wherein the poly(2-vinylpyridine) is in the form of a self-supporting body.

* * * * *